United States Patent [19]

Calder et al.

[11] 4,126,765
[45] Nov. 21, 1978

[54] DETECTOR CIRCUIT FOR SENSING BATTERY POLARITY AND LOOP CLOSURE

[75] Inventors: John A. Calder, Chicago; Richard M. Rovnyak, Schaumburg; David Q. Lee, Chicago, all of Ill.

[73] Assignee: GTE Automatic Electric Laboratories Incorporated, Northlake, Ill.

[21] Appl. No.: 859,907

[22] Filed: Dec. 12, 1977

[51] Int. Cl.² ............................................. H04M 7/14
[52] U.S. Cl. ............................................. 179/18 AH
[58] Field of Search ................................... 179/18 AH

[56] References Cited
U.S. PATENT DOCUMENTS 4,049,919  9/1977  Young ........................ 179/18 AH X Primary Examiner—William C. Cooper
Attorney, Agent, or Firm—Robert J. Black

[57] ABSTRACT

A detector circuit for use in conjunction with a trunk circuit of a PABX telephone system interfacing with a central office providing for constant monitoring of normal or reverse battery application by the central office during the high impedance idle state or the low impedance busy state. In addition, the circuit provides for detection of: proper loop closure, electrically shorted tip and ring leads, open circuit condition of tip and ring leads or a grounded ring lead. Furthermore, the circuit indicates when current flow of proper magnitude is sensed during normal or reverse battery conditions.

9 Claims, 1 Drawing Figure

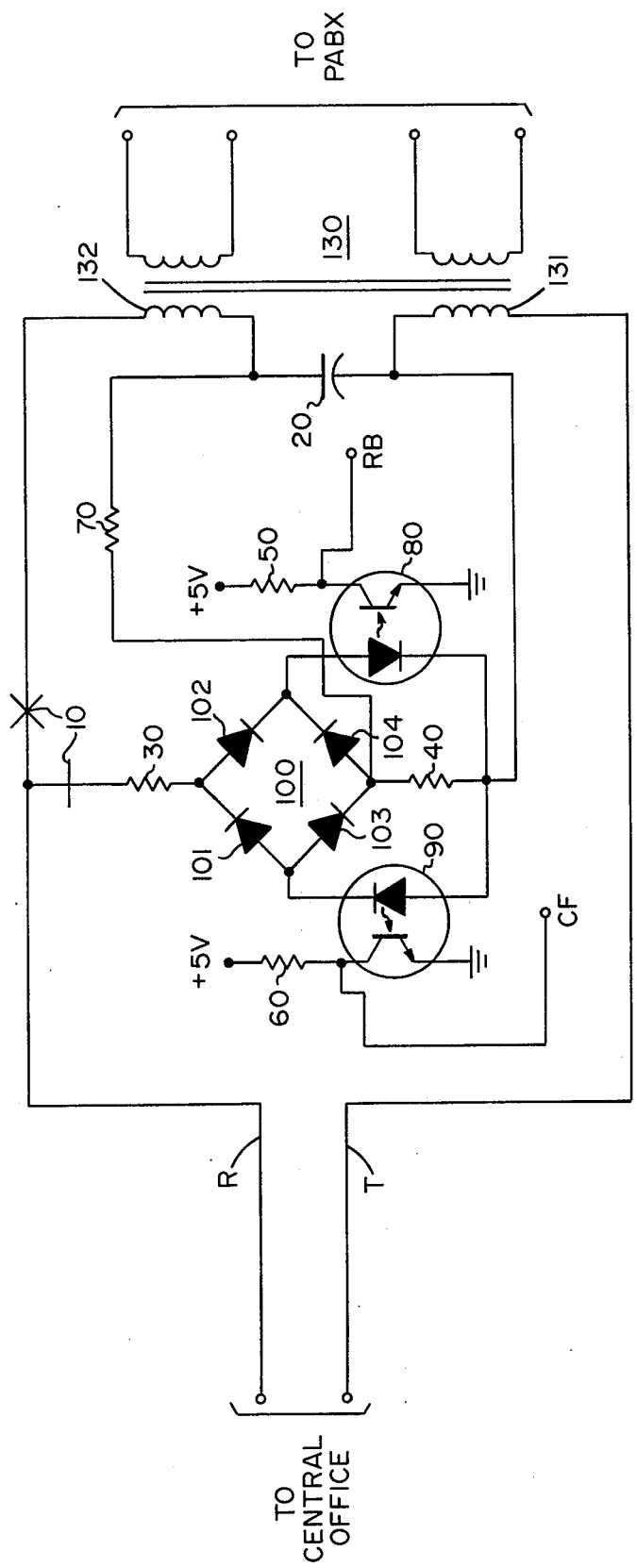

DETECTOR CIRCUIT FOR SENSING BATTERY POLARITY AND LOOP CLOSURE

BACKGROUND OF THE INVENTION (1) Field of the Invention

The present invention relates to telephone trunk circuits and more particularly to a detector circuit for use in a digital private automatic branch exchange, to detect supervisory signals supplied by a central office. The present circuit designed for inclusion in a PABX trunk circuit, provides maintenance indications concerning the integrity of the leads which connect the central office to the PABX.

(2) Description of the Prior Art

In a telephone system it is necessary that a central office provide supervisory signals via the trunk circuit to the PABX. For example, these signals indicate to the PABX that it is to transmit the calling number or the called number. This signalling is accomplished via battery polarity reversals applied at the central office to the tip and ring leads of the trunk circuit.

Existing trunk circuits typically sense such polarity changes by the use of a polar relay which senses only a single polarity change. Such polar relays are expensive, consume relatively large amounts of space and are generally of lower impedance than desirable. Because of the combination of these factors, only limited status monitoring features are provided in most existing trunks. Furthermore, the use of this type of relay does not provide for sensing subsequent polarity reversals in both high impedance and low impedance modes, required for trunk circuit operations.

A partial solution to these problems is taught by U.S. Pat. No. 4,002,850 issued to G. L. Richards et al, which demonstrates the use of an optical-coupler for the detection of single battery polarity reversals initiated at the central office. No positive indication of normal battery detection is taught.

Therefore, it is the object of the present invention to provide a trunk circuit detector for detecting both normal and reverse battery polarity for both high impedance (idle) and low impedance (busy) modes of operation of the trunk circuit, for the detection of fault conditions such as, an electrically shorted tip and ring lead, an open circuit of tip and ring leads, an electrical ground placed onto the ring lead and for a bidirectional loop current threshold sensor.

SUMMARY OF THE INVENTION

The present invention consists of a detector circuit for use in a PABX trunk circuit for detecting normal or reverse battery application at the central office, proper loop closure and loop current threshold sensor. This detector circuit includes a high impedance element and a directional current controlling diode array connected between the tip and ring leads of the trunk circuit. Two optical-coupler devices connected to the diode array and a voltage divider network (low impedance element) connected between the tip and ring leads of the trunk circuit and the diode array.

When the trunk circuit is in the high impedance idle state, application at the central office of battery of normal polarity will produce a first output signal from the first optical-coupler and simultaneously produce a second output signal from the second optical-coupler. Reversal of the battery polarity by the central office will produce a reversal of the output signals at the optical-couplers described above.

When a trunk circuit is switched to the low impedance busy state upon seizure by the PABX, the output signals from the optical-couplers continue to indicate the polarity of battery applied at the central office as described above. In addition, the voltage divider network provides biasing of the diode array so that, the output signals described above will not be produced unless the magnitude of current sensed approximates a particular threshold value.

For fault conditions such as electrically shorted tip and ring leads, an open circuit of tip and ring leads or ground applied to the ring lead, the outputs of both optical-couplers will produce second output signals.

DESCRIPTION OF THE DRAWING

The single sheet of drawings included herewith comprise a schematic diagram of a trunk circuit detector embodying the principles of operation of the present invention.

DESCRIPTION OF THE PREFERRED EMBODIMENT

The drawing included schematically shows the trunk circuit detector connected between the tip (T) and ring (R) leads of a trunk circuit connected between a PABX and a telephone central office. The detector circuit includes a high impedance element 30 (a resistor, having a value between 5,000 and 120,000 ohms) series connected with a directional current controlling diode array 100, which further includes diodes 101, 102, 103 and 104 (arranged in a bridge configuration), between the tip lead T and ring lead R of the trunk circuit. In addition, the detector circuit includes a series connection of resistors 40 and 70 functioning as a voltage divider network, (where resistor 70 has a value between 300 and 600 ohms) connected between the tip lead T and ring lead R of the trunk circuit and having the common connection of resistors 40 and 70 connected to the common connection of diodes 103 and 104. Optical-coupler devices 80 and 90 have a common connection to resistor 40 and lead T and to the junctions of diodes 102 and 104 and diodes 101 and 103, respectively.

When the central office connects a battery of normal polarity (positive) to tip lead T and (negative) to ring lead R, current will flow over a path through winding 131 of hybrid transformer 130, the light emitting diode included in optical-coupler 90, diode 101 and resistor 30 returning through lead R to the central office. As a result, outputs CF and RB will simultaneously take on the values of logic "0" (first output signal) and logic "1" (second output signal), respectively. Upon reversal of the battery polarity, current will flow over a path through resistor 30, diode 102, the light emitting diode included in optical-coupler 80, winding 131 of hybrid transformer 130 returning to the central office via lead T. This operation will result in the CF and RB outputs simultaneously taking on the values of logic "1" and logic "0", respectively.

Upon seizure of the trunk circuit by the PABX, a relay included in the trunk circuit will operate its contacts 10. Upon application of normal battery, current will flow through winding 131 of hybrid transformer 130, resistor 40, resistor 70, winding 132 of hybrid transformer 130 returning to the central office via lead R. If the current flowing through the above described path is approximately equal to a particular established threshold value (20 ma) the voltage drop across resistor 40 will bias diode 103 in the forward direction. Thereby, the light emitting diode included in optical-coupler 90 will conduct current, resulting in output CF going to the logic "0" state and output RB going to the logic "1" state. Application of reverse battery will produce a logic "1" state and a logic "0" state on outputs CF and RB, respectively, as described above.

Should there be improper application of current such as a short between lead T and lead R, an open circuit condition of lead T and lead R or a ground condition on lead R, a fault condition will be produced. In this case no current will flow via the tip lead T and ring lead R over either path through the detector circuit described above. Therefore, no current will flow through the light emitting diodes included in optical-couplers 80 and 90; and outputs CF and RB will take on the logic "1" state simultaneously.

Although a preferred embodiment of the invention has been illustrated, and that form described in detail, it will be readily apparent to those skilled in the art that various modifications may be made therein without departing from the spirit of the invention or from the scope of the appended claims.

What is claimed is:

1. A detector circuit for use in a telephone system including at least first and second switching centers connected via a trunk circuit, said detector circuit comprising:
    directional current control means connected to said trunk circuit;
    a plurality of current detection means connected to said directional current control means, operated in response to application of a DC voltage of a first polarity to said trunk circuit, by said first switching center, conducted through said directional current control means, to transmit a first combination of output signals to said second switching center; and in response to application of a DC voltage of a second polarity to said trunk circuit, by said first switching center, conducted through said directional current control means, to transmit a second combination of output signals to said second switching center.

2. A detector circuit as claimed in claim 1 wherein: said detector circuit is operated in a high impedance mode during idle trunk operation and in a low impedance mode during busy trunk operation by said trunk circuit to produce said first and said second output signal combinations transmitted by said current detection means.

3. A detector circuit as claimed in claim 1 wherein: application of DC voltages of said first and said second polarity by said first switching center to said trunk circuit conducted through said directional current control means, produces said combinations of output signals transmitted by said current detection means to provide an indication of detection of a magnitude of current approximating a predetermined threshold value.

4. A detector circuit as claimed in claim 1 wherein: said trunk circuit including first and second leads each extending from said first to said second switching centers; said directional current control means including a voltage divider network having first and second resistors, series connected between said first and second leads of said trunk circuit; a diode array series connected between said second lead of said trunk circuit and the common connection of said first and said second resistors of said voltage divider network; and a high impedance element series connected between said diode array and said second lead.

5. A detector circuit as claimed in claim 4 wherein: said high impedance element is a resistor of 5,000 to 120,000 ohms.

6. A detector circuit as claimed in claim 4 wherein: said diode array comprises a diode bridge circuit.

7. A detector circuit as claimed in claim 4 wherein: said first resistor of said voltage divider network is of low impedance of 300 to 600 ohms.

8. A detector circuit as claimed in claim 1 wherein: each of said plurality of said current detection means includes an optical-coupler operated to transmit one of said combination of said output signals.

9. A detector circuit for use in a telephone system including at least first and second switching centers connected in loop fashion via a trunk circuit having first and second leads each extending from said first to said second switching centers, comprising:
    directional current control means connected to said trunk circuit;
    a plurality of current detection means connected to said directional current control means, operated in response to application of DC voltages of first and second polarities to said trunk circuit, by said first switching center conducted through said directional current control means, to transmit combinations of said output signals of said current detection means whereby said combinations of said output signals provide indication of proper loop closure, of shorted connection of said first and said second leads, of an open circuit condition of said first and said second leads and electrical ground on said second lead.

* * * * *